United States Patent
Drevon et al.

(10) Patent No.: US 10,863,350 B2
(45) Date of Patent: Dec. 8, 2020

(54) WLAN ACCESS NETWORK SELECTION BY AN USER EQUIPMENT FOR ACCESS TO A MOBILE NETWORK

(71) Applicant: ALCATEL LUCENT, Boulogne-Billancourt (FR)

(72) Inventors: Nicolas Drevon, Nozay (FR); Laurent Thiebaut, Nozay (FR)

(73) Assignee: Nokia Technologies OY, Espoo (FI)

( * ) Notice: Subject to any disclaimer, the term of this patent is extended or adjusted under 35 U.S.C. 154(b) by 0 days.

(21) Appl. No.: 14/891,708

(22) PCT Filed: May 13, 2014

(86) PCT No.: PCT/EP2014/059795
§ 371 (c)(1),
(2) Date: Nov. 17, 2015

(87) PCT Pub. No.: WO2014/184209
PCT Pub. Date: Nov. 20, 2014

(65) Prior Publication Data
US 2016/0374013 A1    Dec. 22, 2016

(30) Foreign Application Priority Data

May 17, 2013   (EP) .................................... 13290110

(51) Int. Cl.
*H04W 4/00*   (2018.01)
*H04W 12/06*   (2009.01)
(Continued)

(52) U.S. Cl.
CPC ........... *H04W 12/06* (2013.01); *H04W 24/02* (2013.01); *H04W 48/18* (2013.01);
(Continued)

(58) Field of Classification Search
CPC ..... H04W 84/12; H04W 80/04; H04W 84/18; H04W 88/06; H04W 74/08
See application file for complete search history.

(56) References Cited

U.S. PATENT DOCUMENTS

2004/0072578 A1* 4/2004 Keutmann ........ H04W 12/0806
455/456.1
2006/0029027 A1* 2/2006 Buckley ................ H04W 48/18
370/338
(Continued)

FOREIGN PATENT DOCUMENTS

EP    2104379 A1    9/2009
EP    2112786 A1    10/2009
(Continued)

OTHER PUBLICATIONS

Office Action for corresponding Chinese Application No. 201480040280.7 dated Mar. 27, 2019.
(Continued)

*Primary Examiner* — Siren Wei
(74) *Attorney, Agent, or Firm* — Harness, Dickey & Pierce, P.L.C.

(57) ABSTRACT

Embodiments of the present invention include a method for WLAN Access Network WLAN-AN selection by an User Equipment UE for access to a mobile network PLMN, said selection including, for an UE roaming in a Visited PLMN VPLMN and requiring a Packet Data Network Gateway PDN-GW in its Home PLMN HPLMN, selection of a WLAN-AN having connectivity to at least one PDN-GW in said HPLMN, based on information on connectivity to at least one PDN-GW in said HPLMN of WLAN-ANs candidate for said selection, referred to as connectivity information.

12 Claims, 3 Drawing Sheets

Figure 1:
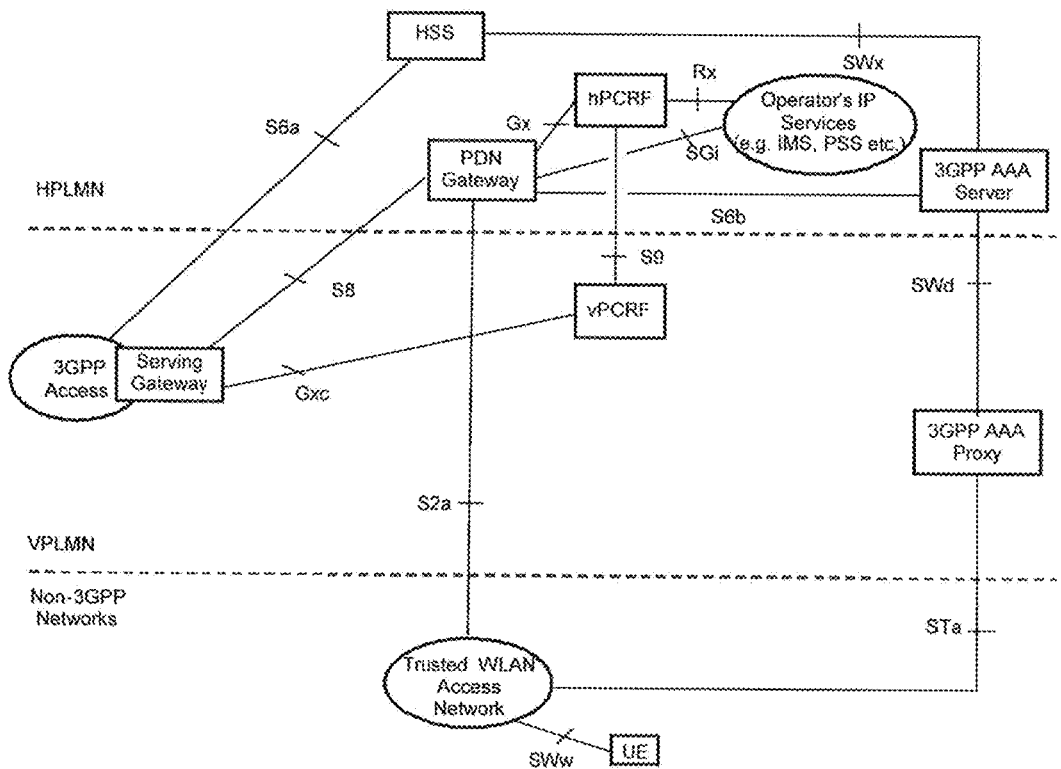

(51) Int. Cl.
*H04W 24/02* (2009.01)
*H04W 48/18* (2009.01)
*H04W 84/04* (2009.01)
*H04W 84/12* (2009.01)
*H04W 88/06* (2009.01)

(52) U.S. Cl.
CPC .......... *H04W 84/042* (2013.01); *H04W 84/12* (2013.01); *H04W 88/06* (2013.01)

(56) References Cited

U.S. PATENT DOCUMENTS

| | | | |
|---|---|---|---|
| 2006/0077986 A1* | 4/2006 | Rune | H04W 12/06 370/401 |
| 2006/0126584 A1 | 6/2006 | Zhang et al. | |
| 2008/0064406 A1 | 3/2008 | Buckley | |
| 2009/0270117 A1 | 10/2009 | Buckley | |
| 2011/0026463 A1 | 2/2011 | Lair | |
| 2012/0257611 A1 | 10/2012 | Buckley | |
| 2014/0233544 A1* | 8/2014 | McCann | H04W 12/06 370/338 |
| 2014/0241333 A1* | 8/2014 | Kim | H04W 48/16 370/338 |

FOREIGN PATENT DOCUMENTS

| | | | |
|---|---|---|---|
| WO | WO-2010/002317 | 1/2010 | |
| WO | WO-2010/037422 | 4/2010 | |
| WO | WO-2012149400 A2 * | 11/2012 | .......... H04B 7/0413 |

OTHER PUBLICATIONS

Office Action dated Dec. 12, 2019, issued in corresponding Chinese Patent Application No. 20140040280.7.

International Search Report PCT/ISA/210 for International Application No. PCT/EP2014/059795 dated Jul. 8, 2014.

Written Opinion of the International Searching Authority PCT/ISA/237 for International Application No. PCT/EP2014/059795 dated Jul. 8, 2014.

"3rd Generation Partnership Project; Technical Specification Group Services and System Aspects; WLAN Network Selection for 3GPP Terminals; Stage 2 (Release 12)", 3GPP Draft; 23865-060-WLAN_NS-RM, 3rd Generation Partnership Project (3GPP), Mobile Competence Centre; 650, Route Des :Ucioles; F-06921 Sophia-Antipolis Cedex; France, Apr. 17, 2013.

* cited by examiner

WLAN ACCESS NETWORK SELECTION BY AN USER EQUIPMENT FOR ACCESS TO A MOBILE NETWORK

CROSS-REFERENCE TO RELATED APPLICATIONS

This application is a national phase under 35 U.S.C. § 371 of PCT International Application No. PCT/EP2014/059795 which has an International filing date of May 13, 2014, which claims priority to European Application No. 13290110.9, filed May 17, 2013, the entire contents of each of which are hereby incorporated by reference.

The present invention generally relates to mobile communication networks and systems.

Detailed descriptions of mobile communication networks and systems can be found in the literature, such as in particular in Technical Specifications published by standardization bodies such as for example 3GPP ($3^{rd}$ Generation Partnership Project).

In general, in a packet mobile communication system, an User Equipment (UE) has access to a mobile network providing Packet Data Network (PDN) connectivity services. A mobile network generally comprises a Core Network (CN) accessed by an Access Network (AN). The CN generally comprises, amongst others, a mobility anchor point called a PDN Gateway (PDN-GW) interfacing with an external PDN (typically an IP network, such as Internet, Intranet, or Operator's IP network e.g. IMS network). A PDN connection established between an UE and a PDN/IP network over a mobile network can be used to have access to various IP-based user services or applications.

An example of packet mobile communication system is Evolved Packet System (EPS). An EPS network comprises a CN (called Evolved Packet Core (EPC)), which can be accessed by a 3GPP Access Network (3GPP AN) such as for example E-UTRAN, as well as by a Non-3GPP Access Network (non-3GPP AN) such as in particular WLAN Access Network (WLAN-AN) which will be considered more particularly in the following.

WLAN access to EPC is specified in particular in 3GPP TS 23.402. A distinction between trusted and un-trusted WLAN Access Networks has been introduced in particular in 3GPP TS 23.402 and 3GPP TS 33.402. As described in 3GPP TS 23.402, a trusted WLAN Access Network can have access to EPC via an interface called S2a interface with a PDN-GW in EPC.

Examples of roaming architectures for Trusted WLAN access to EPC are recalled in FIG. 1 (Home Routed case) and 2 (Local Break-Out LBO case) taken from 3GPP TS 23.402. In these roaming architectures, the UE, whose user has a subscription with a Home PLMN (HPLMN), is roaming in a Visited PLMN (VPLMN). In the Home Routed case, the Trusted WLAN Access Network has access via S2a interface to a PDN-GW in the HPLMN. In the LBO case, the Trusted WLAN Access Network has access via S2a interface to a PDN-GW in the VPLMN. Certain user services, also referred to as Home Routed services, may require the use of a PDN GW in the HPLMN, whereas other services, also referred to as LBO-based services, may require the use of a PDN GW in the VPLMN. Examples of Home Routed services may include corporate VPN, HTTPS banking transactions . . . etc. Examples of LBO-based services include Voice over IMS . . . etc.

In such systems, it is very important to select an appropriate WLAN Access Network for access by an User Equipment UE to a mobile core network (such as EPC network).

However, as recognized by the inventors and as will be explained with more detail later, currently specified WLAN Access Network selection procedures fail to provide appropriate WLAN Access Network selection in some cases, in particular for an UE requiring the use of a PDN-GW in the HPLMN (such as for Home Routed services), and in particular for an UE simultaneously requiring the use of a PDN-GW in the VPLMN (such as for LBO-based services) and the use of a PDN-GW in the HPLMN (such as for Home Routed services). Failing to provide appropriate WLAN Access Network may have serious consequences. Thus, there is a need to improve WLAN Access Network selection, in particular for such cases. More generally there is a need to improve performances of such systems.

Embodiments of the present invention in particular address such needs.

These and other objects are achieved, in one aspect, in an embodiment, by a method for WLAN Access Network WLAN-AN selection by an User Equipment UE for access to a mobile network PLMN, said selection including, for an UE roaming in a Visited PLMN VPLMN and requiring a Packet Data Network Gateway PDN-GW in its Home PLMN HPLMN, selection of a WLAN-AN having connectivity to at least one PDN-GW in said HPLMN, based on information on connectivity to at least one PDN-GW in said HPLMN of WLAN-ANs candidate for said selection, referred to as connectivity information.

These and other objects are achieved, in other aspects, by various entities of a mobile communication system, configured to carry out related steps of a method according to embodiments of the present invention, said entities including, in particular (though not exclusively): User Equipment UE, WLAN Access Network entity such as Access Point AP.

Figure 2:
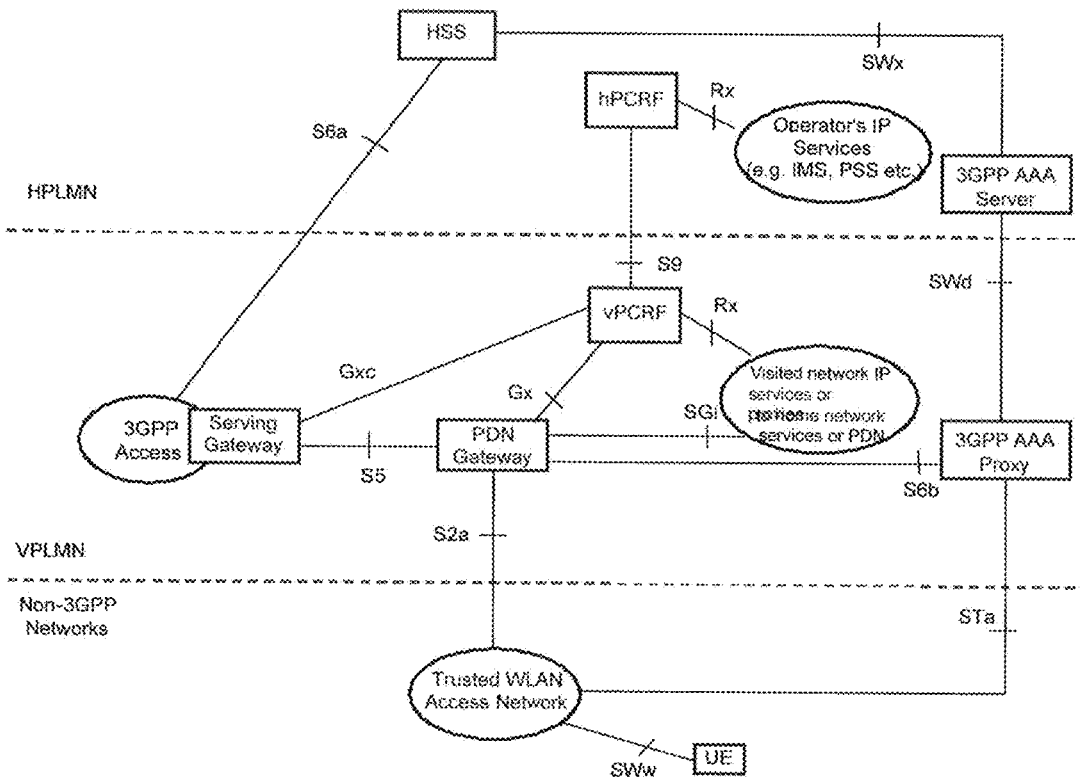
Figure 3:
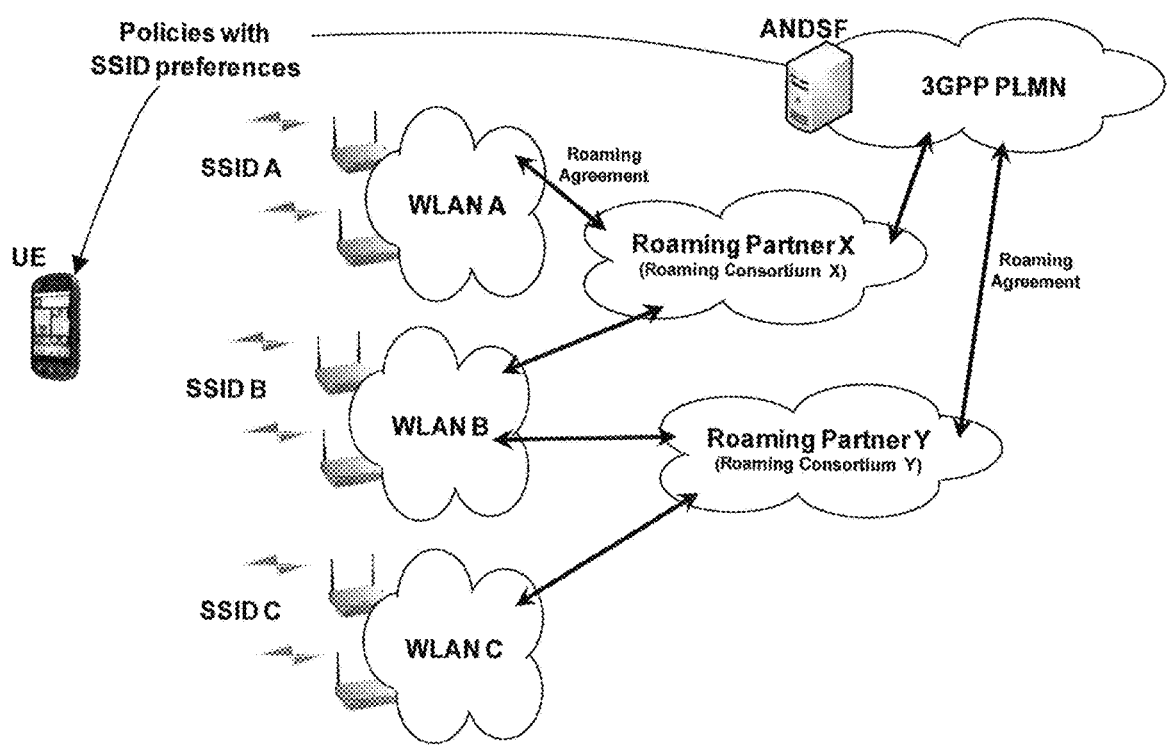
Figure 4:
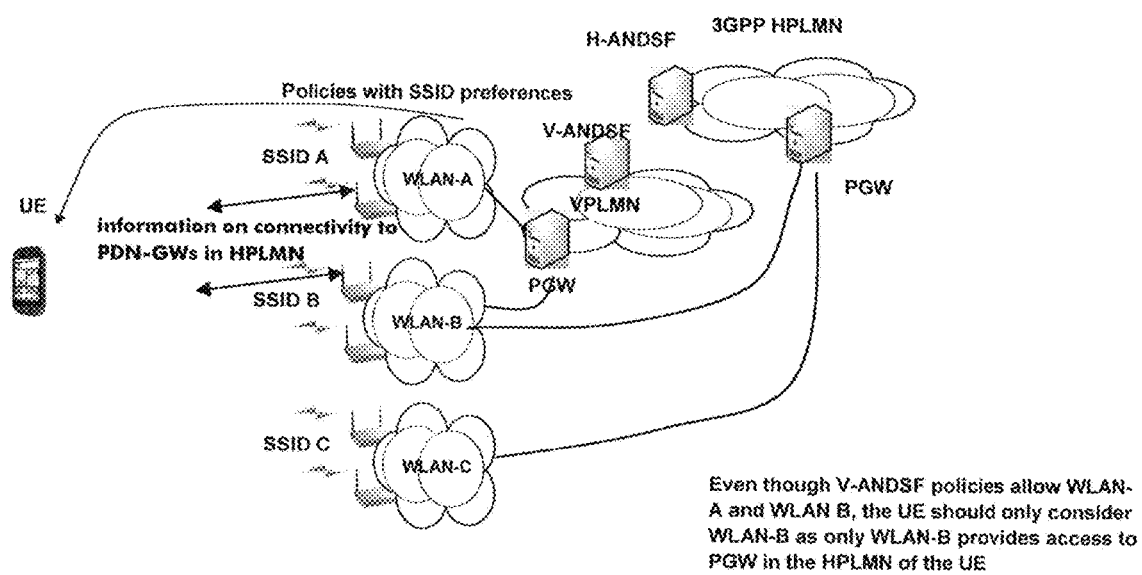

Some embodiments of apparatus and/or methods in accordance with embodiments of the present invention are now described, by way of examples only, and with reference to the accompanying drawings, in which:

FIG. 1 is intended to recall an example of roaming architecture for Trusted WLAN Access to EPC, Home Routed case, FIG. 2 is intended to recall an example of roaming architecture for Trusted WLAN Access to EPC, Local Break-Out case, FIG. 3 is intended to recall WLAN access through roaming agreements, FIG. 4 is intended to illustrate embodiments of the present invention.

Various embodiments and/or aspects of the present invention will be more detailed in the following, by way of example for WLAN access to 3GPP based-EPS network. However it should be understood that embodiments of the present invention are not limited to this example and could apply in particular to other mobile networks, whether 3GPP-based or not 3GPP-based.

A terminal (UE) can access a mobile core network such as EPC via 3GPP radio access technologies (e.g. GERAN, UTRAN, E-UTRAN) but also via a non-3GPP network such as WLAN. The UE can access EPC via both access technologies simultaneously or not depending on the UE capabilities. This is described in 3GPP TS 23.402 and 24.302. A UE can handle several IP flows at same time, some IP flows using WLAN access while others using the 3GPP access technology.

Data services such as Voice over IP (VoIP), VPN access (e.g. access to an enterprise network) when MOBIKE is not supported, HTTPS sessions (e.g. banking transactions), require service continuity. Service continuity can be guaranteed only if the corresponding IP flows keep the same IP address when that IP flow is moved between WLAN and 3GPP accesses (either because the UE loses the 3GPP coverage or because the UE or the network has decided to move the IP flow). When the UE uses 3GPP access for data services requiring IP address preservation, access to a PDN GW in EPC is therefore required because the IP address is allocated by the PDN GW or an entity beyond it, and that PDN GW is the anchor point for mobility. This means that when an IP flow is moved to WLAN access, the UE shall make sure that the user data can be conveyed between WLAN access and the PDN GW, i.e. that connectivity between the WLAN access and the PDN GW is possible (or said otherwise that an S2a interface can be set between the local WLAN access and the PDN GW). Therefore, when the UE selects a WLAN access, it should make sure that the WLAN has connectivity to PDN GWs in the PLMN where the services are expected to access.

There are also other data services that require access to a PDN GW in the EPC such as home routed services with parental control or some services provided by the home mobile operator service platform.

In roaming cases, per 3GPP standards and GSMA recommendations, services like VoIP are routed via a PDN GW in the Visited PLMN where the UE is registered. Whereas, other services such as VPN access or HTTPS sessions may be routed via a PDN GW in the UE's Home PLMN.

This means that a roaming UE may simultaneously have PDN connections with a PDN GW in the HPLMN and PDN connections with a PDN GW in the VPLMN.

In Summary
- IP address preservation between 3GPP and WLAN requires that connectivity between the WLAN access and the PDN GW is possible (or said otherwise that an S2a interface can be set between the WLAN access and the PDN GW).
- IP address preservation should be ensured between 3GPP VPLMN and WLAN also in roaming cases.
- Up to now 3GPP has focused on making sure that IP address preservation between 3GPP and WLAN works for VoIP (VoIMS) i.e. in the case where the PDN GW is in the VPLMN (so called LBO—Local Break Out-mode)
- One problem is that a roaming UE may simultaneously have PDN connections with a PDN GW in the HPLMN (Home Routed mode, e.g. For HTTPS sessions or VPN access) and PDN connections with a PDN GW in the VPLMN (LBO mode e.g. for VoIP).

In existing 3GPP or WiFi Alliance (WFA) specifications there are no ways for the UE to know whether a WLAN has connectivity to PDN GW(s) of its Home PLMN.

In 3GPP standards, a mechanism to select a WLAN is described in TS 23.234 and 24.234 (I-WLAN selection) but this mechanism is somehow considered as needing strong modifications and other mechanisms using ANDSF are under study at 3GPP standards body and described in TR 23.865.

In embodiments of the present invention, it is proposed to use Visited ANDSF (V-ANDSF) to select the WLAN when the UE is expected to use VoIP, and this is because the VPLMN can be easily configured to know whether a WLAN access of that PLMN or of one of its WLAN partners can access the VPLMN PDN GWs or not.

A solution could work as follows to support services that are routed via a PDN GW in the UE's Home PLMN: the Home ANDSF (H-ANDSF) could also be configured to know, in all foreign PLMNs, all the WLANs having connectivity with PDN GWs in the Home PLMN. The UE would then mix the two sets of ANDSF policies i.e.:
  V-ANDSF policies referring to WLAN AN(s) with which the PDN GW of the VPLMN can establish a S2a connectivity
  H-ANDSF policies referring to WLAN AN(s) with which the PDN GW of the HPLMN can establish a S2a connectivity The issues of this kind of solutions are:
Potential complexity for the UE to use both V-ANDSF and H-ANDSF policies for finding a WLAN that satisfies both conditions;
Complex OAM in the H-ANDSF that may require configuration for all the WLAN of the roaming partners
  In order to avoid heavy and never up to date configuration, such a solution could be improved to not requiring configuring H-ANDSF for each WLAN separately but for a set of WLANs such as those of a "roaming consortium" or those that broadcast the same "SSID". An example deployment where the 3GPPoperator has roaming agreements with "roaming consortiums" is illustrated in FIG. 3 taken from 3GPP TR 23.865. But some WLANs of a "roaming consortium" can have connectivity to PDN GWs of the HPLMN while others don't. Therefore, H-ANDSF cannot be used to solve this issue.

In TS 24.234 annex A, it is specified that a list of PLMNs can be sent by the WLAN access to the UE using IEEE Std 802.11u™-2011 Generic Container (ANQP). But this list of PLMNs corresponds to 3GPP AAA proxy servers that are accessible for authentication purposes and not to a list of HPLMN with which the WLAN access supports a S2a interface.

Embodiments of the present invention are based on one or more of the following ideas:
Providing the UE with information on whether the WLAN access can set up a S2a interface with the HPLMN of the UE. This is illustrated, in an example of system architecture, in FIG. 4. This information may be
Sent as a list of PLMNs for which the WLAN access has connectivity with PDN GWs (the WLAN access supports a S2a interface with PDN GW of these PLMN(s));
As an alternative, the UE can request the network (e.g. via IEEE 802.11 ANQP query) whether WLAN has connectivity to PDN GWs of a specific PLMN by providing the PLMN identity to the network;
Enhancing the WLAN selection algorithms in the UE by restricting the list of candidate WLANs to those which have connectivity to PDN GWs in the UE's Home PLMN;
Configuring the UE (via ANDSF or other means) with an indication on whether "HPLMN PDN GW access is required"; This information may be:
  A global indicator "HPLMN PDN GW access is required" set on the UE by the H-ANDSF;
  As an alternative, the UE may be configured per APN on whether "this APN may use a PDN GW from the HPLMN.
Using the said indication in the UE as a condition for restricting the list of candidate WLANs to those which have connectivity to PDN GWs in the UE's Home PLMN.
Following text provides more detailed embodiments on the UE behavior when the UE is configured with "HPLMN PDN GW access is required":

The condition "HPLMN PDN GW access is required" is assumed to apply when
Either a global indicator "HPLMN PDN GW access is required" has been set on the UE,
Or the UE is configured with the indication "this APN may use a PDN GW from the HPLMN" for at least one of the APN towards which the UE has activated a PDN connection;
When the UE is configured to prefer WLANs that allow session continuity, the UE first considers the WLAN accesses that are referred by the V-ANDSF policies. [this mechanism is currently discussed at 3GPP SA2 and documented in TR 23.865];
Over these WLAN accesses, the UE gets the information on whether the WLAN access can set up a PDN connection over a S2a interface with a PDN GW in its HPLMN. If the indication is negative then the WLAN access is no more considered as a candidate for WLAN AN selection by the UE.

Following description includes example description of problems ("Problem statement") and description of example solutions ("Solution description") according to embodiments of the present invention.

Problem Statement

In solutions #3 and #4 described in 3GPP TR 23.865, the UE is configured for the roaming case to either "prefer WLANs provided by the HPLMN" or "not prefer WLANs provided by the HPLMN". When the UE is configured to not prefer WLANs provided by the HPLMN, the UE selects the "active" ANDSF ISRP rule from the rules provided by the VPLMN (V-ANDSF). This allows providing seamless continuity in local break out scenario for services that require IP address preservation: an example of such service is VoIMS. This is mainly because only VPLMN can ensure that TWAN provides S2a connectivity to some its own PDN GWs.

The UE is configured to prefer WLANs provided by the HPLMN mainly for NSWO service. On the other hand, there are also services requiring IP address preservation: Corporate VPN, https banking transactions, etc are some examples. A solution would be to configure the UE to prefer WLANs provided by the HPLMN, as the HPLMN should be aware of which WLANs have direct connectivity with its PDN GWs.

However, it is expected that an operator will wish to simultaneously provide VoIMS and home routed services with IP address preservation, such as Corporate VPN and https transactions. A solution is proposed below.

Solution Description

Overview

V-ANDSF allows selecting a list of WLANs that have S2a connectivity with one or more PDN GWs in the VPLMN. However, it does not ensure that any WLAN in that list have connectivity with one or more PDN GWs in the HPLMN, as the VPLMN is not aware of that (especially when some WLAN in that list are not operated by the VPLMN itself but by one of its partners).

It is therefore necessary to make the UE aware of which WLANs in the list provided by V-ANDSF have connectivity to PDN GW(s) in its HPLMN. This is possible e.g. via extending ANQP information to provide the list of PLMNs a WLAN has PDN GW (S2a) connectivity with in addition to the existing list of PLMNs a WLAN can use for authentication and specified in TS 24.234 annex A (using IEEE Std 802.11u™-2011 Generic Container). This could be coded either as separate lists of PLMNs, or as a list of PLMNs with two bits per PLMN indicating whether it is for authentication, PDN GW connectivity or both. Alternatively, the UE could request the WLAN whether it has connectivity to a specific PLMN via ANQP query. This is a stage 3 matter.

The UE will then be able to select a WLAN that has connectivity with VPLMN and HPLMN, which will guarantee IP address preservation for LBO-based VoIMS and will allow simultaneous home routed services:

Applicability to "Solution #3" and "Solution #4"

1) WLAN Selection Algorithms

Let's assume that ANDSF rules apply for the UE.

In solution #3, the list of WLANs provided by ANDSF is constituted by the WLANs that "best" match with the ISRP active rule. A priori, it is not guaranteed that the WLANs in this list have connectivity to the UE's HPLMN because ISRP rules do not take into account the PLMN.

In solution #4, the list of WLANs provided by ANDSF is constituted by all the WLANs that match with the active ISRP rule, and the PLMN selection is processed after, allowing the UE to select a WLAN that connects (for authentication purposes only) to the HPLMN as highest priority PLMN. But the PLMN selection process is not related to connectivity with PDN GW(s) in the HPLMN.

In order to select WLANs with connectivity to PDN GW(s) of the HPLMN, it will be necessary for the UE to restrict the WLAN list to those which have connectivity with PDN GW in HPLMN. And this should be done BEFORE the PLMN selection process.

Taking an example of enhanced ISRP Flow distribution rule for IFOM or MAPCON:
Access Priority 1: WLAN, any SSID, realm="example1.com"
Access Priority 2: 3GPP access
Access Priority 3: WLAN, any SSID, realm="example2.com"

The list of WLANs that will match the ISRP rule are WLANs realm "example1.com" and WLANs realm "example2.com". Let's assume that only WLANs realm "example2.com" have access to PDN GWs in the UE's HPLMN.

With unchanged solution #3, the "best" match will be WLANs realm "example1". But it has no access to HPLMN PDN GWs. Therefore, solution #3 should be enhanced to:
1. First (unchanged), select all WLANs that "simply" match to the ISRP rule;
2. Second (enhancement), remove from this list all WLANs that have no access to PDN GWs in the UE's HPLMN (e.g. by looking at the enhanced ANQP information);
3. Third (unchanged), find the "best" match among them.

With solution #4, enhancement will be almost similar:
1. First (unchanged), select all WLANs that match to the ISRP rule;
2. Second (enhancement), remove from this list all WLANs that have no access to PDN GWs in the UE's HPLMN (e.g. by looking at the enhanced ANQP information);
3. Third (unchanged), perform PLMN selection for authentication purposes.

2) How to Inform the UE that it should Select a WLAN for IP Address Preservation in Both the VPLMN and the HPLMN?

Existing mechanism relies on configuring the UE (by the home operator or the user) to either "prefer WLANs provided by the HPLMN" or "not prefer WLANs provided by the HPLMN". To ensure IP preservation in LBO (Local Break Out) case, the UE would be configured to "not prefer WLANs provided by the HPLMN". But if the home operator also requires home routed services (e.g. with IP address preservation), it is necessary to provide an additional configuration for the case UE is configured to "not prefer WLANs provided by the HPLMN". This additional UE configuration flag could take two values:

"HPLMN PDN GW access not required": in this case, the WLAN selection algorithm comprises above steps 1 and 3;

"HPLMN PDN GW access required": in this case, the WLAN selection algorithm comprises above steps 1, 2 and 3;

In one aspect, there is provided a method for WLAN Access Network WLAN-AN selection by an User Equipment UE for access to a mobile network PLMN.

Various embodiments are provided, which may be used alone or in combination, according to various combinations.

In an embodiment, said selection includes, for an UE roaming in a Visited PLMN VPLMN and requiring a Packet Data Network Gateway PDN-GW in its Home PLMN HPLMN, selection of a WLAN-AN having connectivity to at least one PDN-GW in said HPLMN, based on information on connectivity to at least one PDN-GW in said HPLMN of WLAN-ANs candidate for said selection, referred to as connectivity information.

In an embodiment, said method comprises:
providing said UE with said connectivity information.

In an embodiment, said method comprises:
a candidate WLAN-AN providing said UE with connectivity information including a list of PLMNs for which said candidate WLAN-AN has connectivity with at least one PDN-GW.

In an embodiment, said method comprises:
said UE requesting connectivity information to a candidate WLAN-AN, including requesting whether said WLAN-AN has connectivity to at least one PDN-GW in a specific PLMN.

In an embodiment, said method comprises:
said UE requesting connectivity information to a candidate WLAN-AN, including requesting whether said WLAN-AN has connectivity to at least one PDN-GW in a specific PLMN, via UE to WLAN-AN signalling.

In an embodiment, said method comprises:
said UE requesting connectivity information to a candidate WLAN-AN, including requesting whether said WLAN-AN has connectivity to at least one PDN-GW in a specific PLMN, via IEEE 802.11u ANQP protocol.

In an embodiment, said method comprises:
a candidate WLAN-AN responding to a request for connectivity information, including whether said WLAN-AN has connectivity to at least one PDN-GW in a specific PLMN.

In an embodiment, said method comprises:
a candidate WLAN-AN responding to a request for connectivity information including whether said WLAN-AN has connectivity to at least one PDN-GW in a specific PLMN, via IEEE 802.11u ANQP protocol.

In an embodiment, said method comprises:
configuring said UE with an indication on whether connectivity with at least one PDN-GW in HPLMN is required.

In an embodiment, said method comprises:
configuring said UE with an indication on whether connectivity with at least one PDN-GW in HPLMN is required, said indication including a global indicator set on the UE by an Home Access Network Discovery and Selection Function H-ANDSF in HPLMN.

In an embodiment, said method comprises:
configuring said UE per Access point Name APN with an indication on whether a PDN-GW in HPLMN is required.

In an embodiment, said method comprises:
said UE restricting a list of candidate WLAN-ANs, to those candidate WLAN-ANs having connectivity with at least one PDN-GW in said HPLMN, based on said connectivity information.

In an embodiment, said method comprises:
said UE using an indication on whether a PDN-GW in HPLMN is required, as a condition for restricting a list of candidate WLAN-ANs to those candidate WLAN-ANs having connectivity with at least one PDN-GW in said HPLMN.

In an embodiment, said method comprises:
said UE, having obtained a list of candidate WLAN-ANs allowing session continuity through connectivity with at least one PDN-GW in the VPLMN, getting, over signalling between WLAN-AN and UE, connectivity information including whether said WLAN-ANs have connectivity to at least one PDN-GW(s) in said HPLMN, and if said information is negative, said UE no more considering said WLAN-ANs as candidate WLAN ANs for said selection.

Other embodiments may be provided, based on above description.

In other aspects, there are provided various entities configured to carry out related steps of a method according to embodiments of the present invention, said entities including, in particular (though not exclusively): User Equipment UE, WLAN Access Network entity such as Access Point AP.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:
1. An apparatus comprising:
at least one processor; and
at least one memory including computer program code;
the at least one memory and the computer program code configured to, with the at least one processor, cause the apparatus at least to perform:
receive from at least one wireless local area network, information referred to as connectivity information comprising a list of public land mobile networks to which said at least one wireless local area network has S2a connectivity,
determine a list of wireless local area networks, referred to as candidate wireless local area networks, that are candidate to be selected for wireless local area network access by said apparatus to a public land mobile network,
determine if an indication has been received, indicating if a wireless local area network having S2a connectivity to a public land mobile network is to be selected for said wireless local area network access by said apparatus to a public land mobile network, and if said indication has been received, restrict said list of candidate wireless local area networks, to those candidate wireless local area networks having S2a connectivity to a public land mobile network, based on said received connectivity information.

2. The apparatus according to claim 1, the at least one memory and the computer program code configured to, with the at least one processor, cause the apparatus at least to perform:

receive said connectivity information from said at least one wireless local area network as access network query protocol information.

3. The apparatus according to claim 1, the at least one memory and the computer program code configured to, with the at least one processor, cause the apparatus at least to perform:

receive said connectivity information from said at least one wireless local area network in addition to a list of public land mobile networks said at least one wireless local area network can use for authentication for wireless local area network access to a public land mobile network.

4. A method comprising:

receiving from at least one wireless local area network, information referred to as connectivity information comprising a list of public land mobile networks to which said at least one wireless local area network has S2a connectivity, determining a list of wireless local area networks, referred to as candidate wireless local area networks, that are candidate to be selected for wireless local area network access by a user equipment to a public land mobile network, determining if an indication has been received, indicating if a wireless local area network having S2a connectivity to a public land mobile network is to be selected for said wireless local area network access by said user equipment to a public land mobile network, and if said indication has been received, restricting said list of candidate wireless local area networks, to those candidate wireless local area networks having S2a connectivity to a public land mobile network, based on said received connectivity information.

5. The method according to claim 4, comprising receiving said connectivity information from said at least one wireless local area network as access network query protocol information.

6. The method according to claim 4, comprising receiving said connectivity information from said at least one wireless local area network in addition to a list of public land mobile networks said at least one wireless local area network can use for authentication for wireless local area network access to a public land mobile network.

7. The method according to claim 4, comprising receiving from said at least one wireless local area network, access network query protocol information including a list of public land mobile networks said at least one wireless local area network can use for authentication for wireless local area network access to a public land mobile network, and a list of public land mobile networks to which said at least one wireless local area network has S2a connectivity.

8. The method according to claim 4, comprising:

determining if an indication has been received, indicating if a wireless local area network having S2a connectivity to a home public land mobile network of said equipment is to be selected for said wireless local area network access by said user equipment to a public land mobile network, and if said indication has been received, restricting said list of candidate wireless local area networks, to those candidate wireless local area networks having S2a connectivity to said home public land mobile network, based on said received connectivity information.

9. The method according to claim 4, comprising:

determining a list of wireless local area networks, referred to as candidate wireless local area networks, that are candidate to be selected for wireless local area network access by said user equipment to a public land mobile network, based on information received from a visited public land mobile network, visited by said user equipment.

10. The apparatus according to claim 1, the at least one memory and the computer program code configured to, with the at least one processor, cause the apparatus at least to perform:

receive from said at least one wireless local area network, access network query protocol information including a list of public land mobile networks said at least one wireless local area network can use for authentication for wireless local area network access to a public land mobile network, and a list of public land mobile networks to which said at least one wireless local area network has S2a connectivity.

11. The apparatus according to claim 1, the at least one memory and the computer program code configured to, with the at least one processor, cause the apparatus at least to perform:

determine if an indication has been received, indicating if a wireless local area network having S2a connectivity to a home public land mobile network of said apparatus is to be selected for said wireless local area network access by said apparatus to a public land mobile network, and if said indication has been received, restrict said list of candidate wireless local area networks, to those candidate wireless local area networks having S2a connectivity to said home public land mobile network, based on said received connectivity information.

12. The apparatus according to claim 1, the at least one memory and the computer program code configured to, with the at least one processor, cause the apparatus at least to perform:

determine a list of wireless local area networks, referred to as candidate wireless local area networks, that are candidate to be selected for wireless local area network access by said apparatus to a public land mobile network, based on information received from a visited public land mobile network, visited by said apparatus.

* * * * *